June 4, 1940.　　　　L. GWATHMEY　　　　2,203,526
METHOD OF AND APPARATUS FOR CONTROLLING TEMPERATURE
Filed Nov. 17, 1936
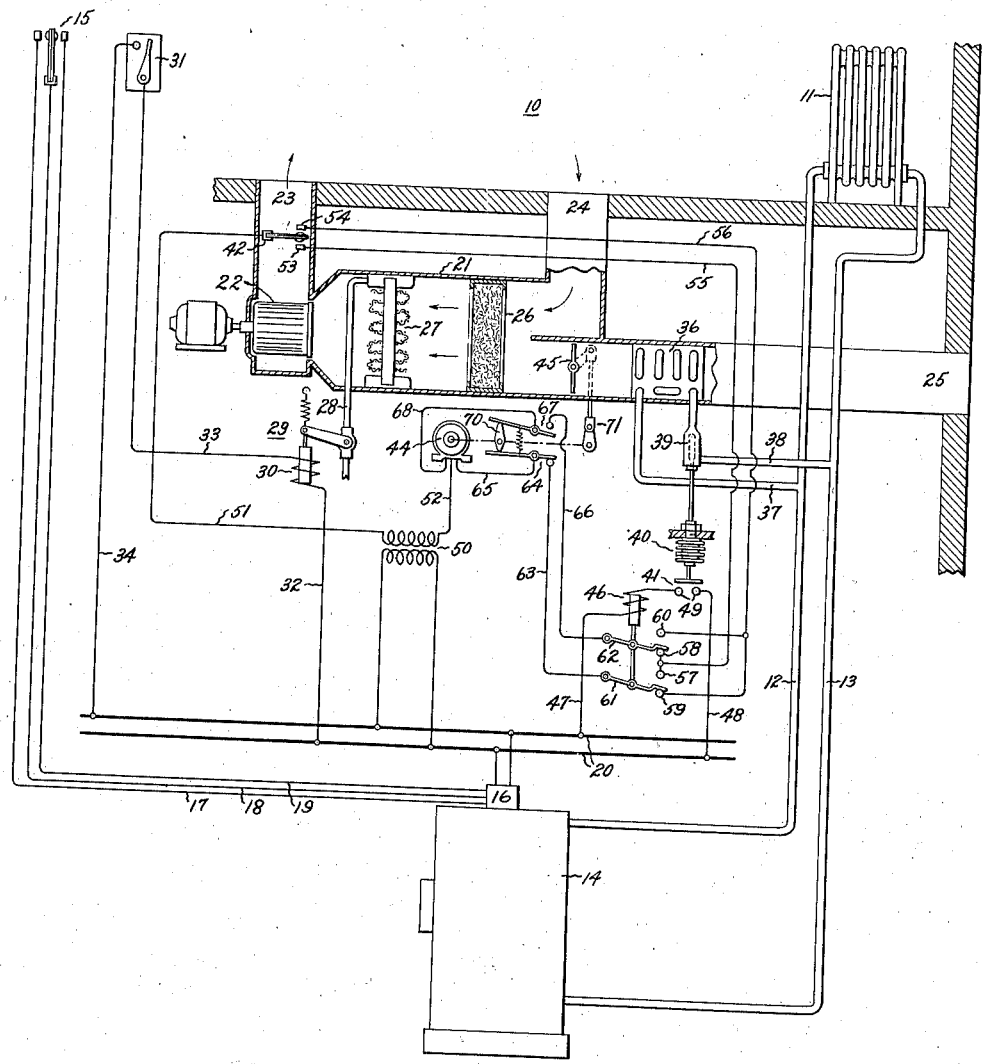
Inventor:
Lomax Gwathmey,
by Harry E. Dunham
His Attorney.

Patented June 4, 1940

2,203,526

UNITED STATES PATENT OFFICE 2,203,526

METHOD OF AND APPARATUS FOR CONTROLLING TEMPERATURE

Lomax Gwathmey, Baltimore, Md., assignor to General Electric Company, a corporation of New York Application November 17, 1936, Serial No. 111,248

12 Claims. (Cl. 236—37)

My invention relates to a method of and apparatus for controlling temperatures and particularly to apparatus adapted for use with existing conventional radiator or convector heating systems.

It is a primary object of my invention to provide an improved heating and ventilating system for use with existing radiator systems or the like which provides an optimum amount of ventilation air at all times.

In conventional heating systems the supply of heat to the enclosure or building is inherently intermittent because the heating system is usually of such capacity that it is not operating continuously. If the system is provided with a source of ventilation or fresh air then, when the heat supply is cut off, the ventilation air will cool the air discharged into the room to an extent causing objectionable drafts. To avoid this objectionable result, the ventilation air duct could be provided with a damper adapted to be closed when the heat supply is cut off, but such an arrangement would result in cutting off all supply of ventilation air during these periods.

It is an object of my invention to overcome this deficiency by providing a system in which the supply of ventilation air may be modulated, i. e., the volume supplied is varied gradually during both those periods when the heating system is and is not supplying heating medium to the enclosure.

I attain these objects by providing for use with existing heating systems an air conditioner having means for circulating air through the enclosure and for supplying thereto a supply of ventilation air. I place a tempering coil in the fresh air duct and supply the coil with heating medium whenever the existing heat exchange means in the enclosure is supplied with heating medium in response to a call for heat by thermal responsive means within the enclosure. I also provide means for regulating the flow of air through the ventilation air duct and control said regulating means by means responsive to temperature variations of the air discharged into the enclosure. The control of the regulating means by the thermal responsive means is so arranged that when the supply of heating medium is cut off, the air flow regulating means is operated to diminish the flow of ventilation air into the room in response to decreasing temperatures in order to prevent the objectionable drafts mentioned above. On the other hand, when the temperature rises, increasing amounts of ventilation air enter the enclosure. In this manner the optimum amount of ventilation air is always made available during the period when the supply of heating medium is cut off, as it is during summer and a large portion of the time in mild weather.

With a tempering coil placed in the ventilation air duct provision must be made to diminish the flow of air past the coil when the temperature of the air discharged into the enclosure increases above a predetermined maximum. In this manner, the heating effect of the tempering coil may be regulated and even terminated by cutting off entirely the flow of ventilation air. To obtain this result it is necessary to reverse the control of the thermal responsive means over the regulating means when heating medium is supplied to the enclosure and tempering coil.

It is, therefore, a further object of my invention to provide means responsive to the flow of heating medium for reversing with respect to temperature the control of the thermal responsive means over the regulating means. This is accomplished by providing a second thermal responsive means that is responsive to the flow of heating medium to the tempering coil and enclosure. Thus, when heating medium is supplied to the tempering coil and enclosure the regulating means is operated to diminish the flow of ventilation air whenever the temperature of the discharged air increases above a predetermined value, and the flow is increased when the temperature decreases below a predetermined minimum value. By this arrangement the high temperature ventilation air is prevented from further increasing the room temperature when the discharged air temperature rises to a certain value.

Another object of my invention is to provide a method of ventilation air supply to an enclosure in which the supply of ventilation air is varied in direct proportion to variations in temperature of the air discharged into the enclosure when the supply of ventilation air is not tempered, and is varied inversely in response to the temperature variations when tempered.

A further object of my invention is to provide an improved ventilation air control in which the position of the air flow regulating means may be modulated in either direction in response to variations in the temperature of the air discharged into the enclosure, and in which the reversal with respect to temperature of the control of the means responsive to the temperature of the discharged air over the regulating means is effected by means responsive to the supply of heating medium.

One advantage of my system resides in the fact that it is applicable to existing heating systems. When circulation, humidification and filtering of the air is desired in structures already provided with heating systems, my invention permits the performance of these functions without disturbing in any manner the existing heating system. It eliminates also the necessity of conveying a constant heating medium supply to the ventilation air heater.

Another advantage of my system is that it may be used with heating systems of the usual "on-off" type as well as with a heating system of the type where the heating medium is supplied periodically or intermittently, the latter type being used extensively in large buildings. In fact, my invention is applicable to any heating system in which the supply of heating medium is intermittently supplied to the space being heated.

Other objects and advantages of my invention will become apparent from the ensuing description taken in conjunction with the accompanying drawing which is set forth for the purpose of illustration of details of arrangement.

The single figure of the drawing shows diagrammatically a heating and ventilating system and illustrates schematically the control system therefor embodying the present invention.

In the drawing, reference numeral 10 indicates an enclosure which may be a building or a portion thereof. In the enclosure is positioned a heat exchanger such as radiator 11 forming part of the usual heating system. The radiator is supplied with a suitable heating medium, which for purpose of description is illustrated as steam, through a supply conduit 12 and a condensate return conduit 13 leading to a furnace or boiler 14. The latter may be of any well-known construction and is illustrated as being of the fluid fuel type.

The operation of the furnace is controlled in response to temperature variations within the enclosure 10 by means of a room thermostat 15 connected to the main furnace control 16 through conductors 17, 18 and 19. The electrically operated parts of the furnace and control 16 are supplied with electricity from a pair of conductors 20. For purpose of illustration it will be assumed that when the thermal element of the thermostat moves to the right in response to a decrease in temperature to close a circuit between conductors 18 and 19 the control is energized to initiate operation of the furnace, and when the thermostat moves to the left in response to an increase in temperature a circuit is closed across conductors 17 and 18 to terminate operation of the furnace. The apparatus thus far described is merely the usual heating system of a building and it should be obvious to those skilled in the art that instead of using the illustrated arrangement the radiator could be supplied with steam from any suitable central source of heat and that the supply thereto could be regulated by a solenoid operated valve controlled by the room thermostat. The radiator system also may be replaced by a connector system of any well-known type.

In order to circulate air through the enclosure and to supply the latter with ventilation or fresh air from outdoors I have provided a conditioner 21 provided with a continuously operating air circulating means 22, a discharge duct 23, a recirculated air duct 24, and a fresh air duct 25. Within the conditioner I have also provided an air filter 26 and a humidifying means 27, the latter illustrated as being of the well-known screen type construction. Water is supplied to the humidifier through conduit 28, the supply being regulated by a spring biased electromagnetically operated valve mechanism 29 including an operating solenoid 30. Energization of the latter is controlled by a humidostat 31 positioned within space 10, the energizing circuit for the solenoid being as follows: From one of the supply conductors 20 through conductor 32 to the solenoid winding 30 and thence through conductor 33 to the humidostat 31 and through conductor 34 to the other of the supply conductors 20.

Within the ventilation air duct I have provided a second heating means consisting of a heat exchanger 36, hereinafter called the tempering coil, adapted to be supplied with a heat exchange medium such as steam from the furnace through a pair of branch conduits 37 and 38, the former of which is connected to the supply conduit 12 and the latter to the condensate return 13. The fresh air flowing through duct 25 is a heat transfer medium which absorbs the heat supplied to the heat exchanger 36 by the steam or other heat exchange medium and transfers this absorbed heat into the enclosure 10. In heat exchange relationship with the steam flowing through return conduit 38 is positioned an immersion bulb 39 filled with a suitable thermostatic fluid adapted to co-operate with bellows 40 to operate a switch element 41. The purpose of this switch is to reverse with respect to temperature the control of a thermostat 42, positioned in the discharge duct 23 so as to be responsive to variations in temperature of the air discharged into the enclosure, over a slow speed reversible electromotor 44 variably controlling the position of air flow regulating means such as the damper 45 positioned in the ventilation air duct. In climates where there is danger of condensate freezing in the tempering coil the damper 45 may be placed up-stream from the coil instead of in the position illustrated.

The control is so arranged that when steam is supplied to conduits 12 and 13, and therefore to conduits 37 and 38, the above-described immersion thermostat mechanism is adapted to reverse the control of the duct thermostat over the damper operating motor. When the steam supply is cut off the switch 41 is in its illustrated position and, as will be described more fully hereinafter, the duct thermostat operates on a decrease in temperature of the discharged air to close an energizing circuit to that winding of the damper operating motor that effects rotation thereof in a direction to close the damper thereby diminishing the supply of ventilation air. On an increase in temperature it is adapted to close an energizing circuit effecting rotation of the motor in an opposite direction to increase the supply of ventilation air. When the steam is on, the immersion thermostat mechanism energizes a reversing relay 46 to reverse the connections from the duct thermostat to the motor thereby reversing with respect to temperature the control of the duct thermostat over the damper operating motor.

The reversing relay 46 is connected across the supply conductors 20 by a circuit including conductors 47 and 48, and a pair of normally open contacts 49 adapted to be bridged by the switch member 41 operated by the immersion thermostat. Power is supplied to the duct thermostat and damper operating motor through a transformer 50, the primary of which is connected to supply conductors 20. One side of the secondary winding of the transformer is connected by conductors 51 to duct thermostat 42 and the other side by a conductor 52 to the common terminal of damper operating motor 44. The duct thermostat has associated therewith a pair of contacts 53 and 54, the former of which is engaged by the thermostat when the temperature decreases below a predetermined minimum value and the latter when the temperature increases above a predetermined maximum value. These contacts are in turn connected by conductors 55 and 56, respectively, to contacts 57 and 58, and 59 and 60, respectively, forming part of the reversing relay mechanism 46. The relay also has associated therewith a pair of switch arms 61 and 62 operable between contacts 57 and 59, and 58 and 60, respectively. Switch arm 61 is connected by a conductor 63 to a limit switch 64 which is in turn connected by a conductor 65 to the opening winding of motor 44. Switch arm 62 is likewise connected through a conductor 66, limit switch 67, and conductor 68 to the closing winding of the motor 44.

Limit switch 67 is indicated in its open position, to which it has been actuated by a cam 70 operated by the motor 44, indicated that the damper 45 has been operated to its closed position by a crank mechanism 71. It should be understood that with the damper in its intermediate position both limit switches 64 and 67 will be closed and when the damper is in its fully open position limit switch 64 alone will be open.

For the purpose of better illustrating the operation of my invention it will be assumed that the room thermostat 15 is operable to maintain a temperature of 72° within the enclosure 10 and that the duct thermostat 42 is adapted to engage its cold contact 53 at a temperature of 70° and its hot contact 54 at a temperature of 74°. It should be understood that these values are merely illustrative and may be varied to suit the requirements of particular installations.

Assuming now that the temperature within the enclosure 10 is above 72° and the operation of the furnace 14 has been terminated, then the apparatus will be in the position indicated. Reversing relay 46 will be de-energized because switch member 41 is out of engagement with the normally open contacts 49. Switch members 61 and 62 of the reversing relay are in engagement with contacts 59 and 58, respectively, and limit switch 67 is in its open position because the damper 45 has been operated to its fully closed position. The condition outlined immediately above will obtain during winter when the temperature requirements within the enclosure have been satisfied and if the temperature of the air discharged into the room was below 70°. If the temperature within the enclosure now continues to rise as a result of sudden increase in outdoor temperature or additional heat liberation within the enclosure as by increased occupancy, lighting or such, then, when temperature of the air discharged into the enclosure increases above 74°, duct thermostat 42 will engage its hot contact 54 thereby energizing the opening winding of motor 44 and rotation of the latter effects a gradual opening of damper 45. The energizing circuit for the opening winding is as follows: From the secondary winding of transformer 50 through conductor 51, thermostat 42 in engagement with contact 54, conductor 56, contact 59 and switch 61 in engagement therewith, conductor 63, limit switch 64, and conductor 65 to the opening winding and thence through conductor 52 back to the other side of the transformer secondary winding. The motor will remain energized and gradually operate the damper to its open position until such time as the temperature of the discharged air decreases to 70°. If the temperature does not decrease to this value as a result of opening the damper, which would be the case in mild weather operation, then the damper will be operated to its fully open position and cam 70 effect opening of limit switch 64. It should be noted that limit switch 67 will be closed immediately after the damper has been moved from its extreme closed position.

It will be obvious to those skilled in the art that according to this arrangement the system will circulate and supply a maximum amount of outdoor air during those periods when no heating medium is being supplied the temperature of the air discharged into the room is 74° or above. Thus, a continuous circulation and maximum supply of fresh air is available during the mild weather or even summer operation.

During those periods when the outdoor temperature is quite low then, with the furnace out of operation, the air discharged into the enclosure 10 may gradually decrease to a value below 70°. Then the closing winding of motor 44 will be energized to effect gradual closure of the damper and gradually diminish the supply of ventilation air, which, it has been assumed, is at a temperature lower than that within the room. The energizing circuit for the closing winding of the motor will be as follows: From the secondary winding of the transformer through conductor 51, thermostat 42 in engagement with cold contact 53, conductor 55, contact 58 and switch 62 in engagement therewith, conductor 66, limit switch 67 now in its closed position, and conductor 68 to the closing winding of the motor 30 and thence from conductor 52 to the secondary winding of the transformer. Motor 44 thereby operates the damper toward its closed position until the temperature of the air rises to a value above 70° and if this should occur before the damper is in its fully closed position, it will remain in some intermediate position because the above-described energizing circuit will be broken by movement of duct thermostat out of engagement with its cold contact. If the temperature again falls below 70° the above-described operation will occur until the damper 45 is moved into its closed position. It will be seen that the control of the damper is modulated, i. e., it will remain in an intermediate position between its fully closed and fully open position as determined by the action of the duct thermostat 42. Thus it is seen that this arrangement provides for a maximum amount of ventilation air permissible under cold weather operation when no heating medium is being supplied to enclosure or tempering coil.

Assuming now that the temperature within the enclosure falls to a value of 72°. Prior to this time the damper 45 will have been operated to a partially or fully closed position because of the fact that the temperature of the air discharged into the space would have dropped to 70°. On a call for heat by the room thermostat a circuit is closed across conductors 18 and 19 to initiate operation of the furnace 14. Steam is supplied to the radiator 11 through conduits 12 and 13 and to the tempering coil 36 in the fresh air duct through conduits 37 and 38. Immersion bulb 39 is subjected to the heat of the stem and the resulting expansion of bellows 40 causes switch 41 to close a circuit across contacts 49, thereby energizing reversing relay 46 through an obvious circuit. Switch members 61 and 62 are moved upwardly into engagement with contacts 57 and 60, respectively, thereby reversing with respect to temperature the control of the duct thermostat over the damper operating motor 44. It having been assumed that damper 45 was operated to a partially or fully closed position and the temperature of the air discharged into the enclosure was below 70°, it will be seen that there will be an immediate energization of the opening winding of motor 44 and rotation of the latter in a direction to effect opening of damper 45. This energizing circuit for the opening winding is as follows: From secondary winding 50 through conductor 51, thermostat 42 in engagement with cold contact 53, conductor 55, contact 57, switch member 61 in engagement therewith, conductor 63, limit switch 64, conductor 65 and thence through the opening winding of the motor 44 and through conductor 52 back to the secondary winding of the transformer.

As a result of the opening movement of the damper, air flows through the ventilation air duct and is heated by the tempering coil 36 and supplied to the enclosure 10. The temperature to which the tempering coil raises the ventilating air is usually somewhat higher than the room temperature and it will be seen that, as the combined heating effects of the two heating means increases the temperature of the air, it will finally raise the same to a value about 70° sometime prior to the time that the temperature within the enclosure has been raised to 72°. As a result of this operation, the last-described energizing circuit is opened by the duct thermostat and the damper remains in some intermediate position. If the combined heating effect is sufficient to increase the temperature of the air discharged into the enclosure to a value above 74° then the duct thermostat closes a circuit including conductor 56 and switch 62 in engagement with contact 60 to energize the closing winding of the motor 44. If the effect of the resulting decrease in volume of heated ventilation air is a decrease in the temperature of the discharged air to a value below 74°, then the damper operating motor will be de-energized and the damper will remain in some new intermediate position. As described above in connection with periods when no steam was supplied to the heat exchangers, the damper 45 will maintain some position between its two extreme positions depending on the temperature of the air discharged into the disclosure.

During mild weather damper 45 will be apt to be near its fully closed position during periods when heating medium is being supplied to the enclosure and the tempering coil, and, consequently, the ventilation air supplied during these periods is comparatively little. But as these periods are of short duration during mild weather, reduction in ventilation air is negligible and overheating of the enclosure is prevented by this arrangement.

Eventually the temperature of the air within the enclosure 10 will reach a value about 72° and thereupon the room thermostat will close a circuit across conductors 18 and 19 to terminate operation of the furnace. The immersion thermostat thereupon moves switch element 41 out of engagement with contacts 49 to de-energize relay 46. Switch members 61 and 62 return to the positions indicated in the drawing and the apparatus will repeat the operation described above when the steam is cut off.

The tempering coil may be advantageously constructed slightly "undersize", i. e., it is not designed to furnish enough heat to supply the full demand under the most severe weather to be met. Thus, during mild weather operation, which is during the greater portion of the time, there would not be so much excess heat in the ventilation air stream. Less throttling of the fresh air flow would be required and a greater amount of fresh air is supplied for the entire heating season.

The amount of fresh air supplied to the enclosure also may be controlled by varying the relation between the temperature maintained by the room thermostat and the temperature maintained by the duct thermostat. By making the lower limit of operation of the latter below that of the room, then during "off" periods and with low outdoor temperatures a greater amount of fresh air will be supplied. This results from the fact that the supply of fresh air is cut off at a lower temperature value.

It will be obvious from the above description that the system does not interfere with the operation of existing heating systems and provides an optimum amount of fresh air at all times. The system is very advantageously used in installations where it is not feasible or desirable to disturb the existing heating system for economic or other reasons.

What I claim as new and desire to secure by Letters Patent of the United States is:

1. In an air conditioning system for an enclosure provided with a selectively operable heating means adapted to supply said enclosure with heating medium and a conditioner including means for circulating air through said space, means for supplying said space with ventilation air, and means supplied with heating medium whenever said heating means is in operation for heating said ventilation air, the method of providing said space with an optimum amount of ventilation air under all conditions which includes diminishing the supply of ventilation air when the temperature of the air discharged into the space decreases below a predetermined minimum value and increasing the supply when the temperature increases above a predetermined maximum value when no heating medium is supplied to said enclosure and ventilation air heating means, and diminishing the supply of ventilation air when the temperature of the air discharged into the space increases above a predetermined maximum value and increasing the supply when the temperature decreases below a predetermined minimum value when heating medium is supplied to said enclosure and ventilation air heating means.

2. In combination, an enclosed space, a first heating means for said space, means including a conditioner provided with a discharge air duct, a recirculated air duct and a ventilation air duct for effecting circulation of air through said space, a second heating means within said ventilation air duct connected for operation simultaneously with said first heating means, means regulating the flow of air through said ventilation air duct, and means including thermal responsive means in said discharge duct and control reversing means therefor responsive to operation of said heating means for controlling the operation of said regulating means.

3. In combination, an enclosed space, a first heating means for said space, means including a conditioner provided with a discharge air duct, a recirculated air duct and a ventilation air duct for effecting circulation of air through said space, a second heating means positioned within said ventilation air duct, means for regulating the flow of air through said ventilation air duct, and means including a first thermal responsive means in said discharge duct and a second thermal responsive means responsive to the operation of the first heating means adapted to reverse with respect to temperature the control of said first mentioned thermal responsive means over said regulating means for controlling the operation of said regulating means.

4. An air conditioner for use with an enclosure provided with a heating system controlled in response to temperature variations in said enclosure including in combination, a discharge air duct and a ventilation air duct, a heater in said ventilation air duct connected with said heating system for simultaneous operation therewith in response to temperature variations in said enclosure means regulating the flow of air through said ventilation air duct, thermal responsive means in said discharge air duct for controlling the operation of said regulating means, and means responsive to the operation of said heating system for reversing the controlling effect of said thermal responsive means upon said regulating means.

5. An air conditioner for use with an enclosure provided with a heating system controlled in response to temperature variations in said enclosure including in combination, a discharge air duct, a recirculation air duct, and a ventilation air duct, a heater in said ventilation air duct connected with said heating system for simultaneous operation therewith in response to temperature variations in said enclosure means regulating the flow of air through said ventilation air duct, means responsive to variations in temperature of the discharged air for controlling the operation of said regulating means, and means responsive to the operation of said heating system for reversing the control of said thermal reresponsive means over said regulating means.

6. An air conditioner for use in structures provided with a heating system including in combination, a discharge air duct and a ventilation air duct, means for regulating the flow of air through said last mentioned duct, thermal responsive means for controlling the operation of said regulating means, and means responsive to the flow of heating medium through said heating system for reversing with respect to temperature the control of said thermal responsive means over said regulating means.

7. In combination, an enclosure provided with a heating system controlled in response to temperature variations in said enclosure, an air conditioner having a discharge air duct and a recirculation air duct connected with said enclosure and a ventilation air duct, a heater in said ventilation air duct connected to be supplied with heating medium from said heating system for tempering the ventilation air whenever said heating system is rendered operative, means regulating the flow of air through said ventilation air duct, means responsive to variations in temperature of the discharged air for controlling the operation of said regulating means, and means responsive to the flow of heating medium through said ventilation air heater for reversing the control of said thermal responsive means over said regulating means.

8. In a system for heating and ventilating an enclosure, the combination including means for supplying heating medium directly to said enclosure in response to temperature variations within said enclosure, a conditioner including discharge, recirculating and ventilation air ducts, means for tempering said ventilation air whenever heating medium is supplied to said enclosure, means in said ventilation duct for regulating the flow of ventilation air, means responsive to variations in temperature of the air discharged into said enclosure for controlling said regulating means, and means responsive to the flow of heating medium to said tempering means for reversing with respect to temperature the control of said first thermal responsive means over said regulating means.

9. An air conditioner for use with an enclosure provided with a heating system controlled in response to temperature variations within said enclosure including in combination, a discharge air duct, ventilation air duct and means supplied with heating medium from said system for tempering the ventilation air, means for regulating the flow of air through said ventilation air duct, means responsive to variations in the temperature of the air flowing through said discharge duct for controlling said regulating means to diminish the flow of said air through said ventilation air duct when the temperature of the discharged air decreases below a predetermined minimum value and to increase the flow when the temperature increases above a predetermined maximum value when no heating medium is flowing through said tempering means, and means including second thermal responsive means responsive to the flow of heating medium through said tempering means for reversing the control of said first mentioned thermal responsive means over said regulating means.

10. In a conditioning system utilizing a temperature changing medium, the combination including regulating means, thermal responsive means for controlling operation of said regulating means, and means responsive to the temperature of the temperature changing medium for reversing with respect to temperature the control of said thermal responsive means over said regulating means.

11. In combination, means for changing the temperature of a heat transfer medium above and below the temperature of an enclosure, regulating means for controlling the flow of said medium to said enclosure, thermal responsive means for reversibly controlling said regulating means in response to temperature variations within said enclosure, and a second thermal responsive means responsive to the temperature of said temperature changing means for reversing with respect to temperature variations within said enclosure the control action of said first mentioned thermal responsive means over said regulating means upon operation of said first means to effect a change in the temperature of the medium supplied to said enclosure above and below the temperature thereof.

12. In combination, reversible regulating means for controlling the flow of a heat transfer medium, thermal responsive means for controlling the reversing operation of said regulating means, heat exchange means for varying the temperature of said heat transfer medium, means for supplying a heat exchange medium to said heat exchange means, and means responsive to the temperature of said heat exchange medium for reversing the reversing control of said thermal responsive means over said regulating means.

LOMAX GWATHMEY.